United States Patent [19]
Goldstein et al.

[11] 3,853,914
[45] Dec. 10, 1974

[54] LIGAND DETERMINATION OF SPIN LABELED COMPOUNDS BY RECEPTOR DISPLACEMENT

[75] Inventors: Avram Goldstein, Stanford; Richard K. Leute, Sunnyvale; Edwin F. Ullman, Atherton, all of Calif.

[73] Assignee: Syva Company, Palo Alto, Calif.

[22] Filed: July 10, 1972

[21] Appl. No.: 270,108

Related U.S. Application Data

[63] Continuation-in-part of Ser. No. 105,535, Jan. 11, 1971, abandoned, and a continuation-in-part of Ser. No. 141,516, May 10, 1971, Pat. No. 3,690,834.

[52] U.S. Cl.......... 260/326.47, 260/239.3, 260/241, 260/285, 260/293.76, 260/295 R, 260/302 R, 260/307 R, 260/309.6, 260/309.7, 260/326.62, 424/9, 424/2, 23/230 R
[51] Int. Cl............................................ C07d 27/04
[58] Field of Search....... 260/326.3, 326.62, 293.88, 260/326.47

[56] References Cited
UNITED STATES PATENTS
3,453,288    7/1969    McConnell ..................... 260/326.8

Primary Examiner—Joseph A. Narcavage

[57] ABSTRACT

Compounds are provided for use in assays of organic compounds, where organic compounds of biological interest are determined at extremely low concentrations by combining in a medium, the composition to be determined, hereinafter referred to as ligand, a high molecular weight material of at least 10,000 molecular weight, which has a site spatially characteristic of the ligand, hereinafter referred to as receptor, and an analog of the ligand having a free radical functionality, hereinafter referred to as "ligand analog". The ligand analog and ligand in the medium compete for the receptor site, the amount of ligand analog bound to the receptor, being dependent on the amount of ligand present in the medium. By following the change in electron spin resonance spectrum of the ligand analog, and comparing it to the change in spectrum which would be obtained in the absence of any ligand, the amount of ligand can be determined.

The ligands of the subject invention are methadone and methadone analogs.

3 Claims, No Drawings

3,853,914

LIGAND DETERMINATION OF SPIN LABELED COMPOUNDS BY RECEPTOR DISPLACEMENT

REFERENCES TO RELATED APPLICATIONS

This application is a continuation in part of U.S. application Ser. Nos. 105,535, filed Jan. 11, 1971, now abandoned, and 141,516, filed May 10, 1971, issued as U.S. Pat. No. 3,690,834.

BACKGROUND OF THE INVENTION

1. Field of the Invention

There is a continuing need for accurate and efficient methods for the rapid analysis of small quantities of organic compounds. Such need is related to widely different areas requiring the determination of minute quantities of organic materials. The need to assay diverse substances, from pollutants in water, soil or air which may be present in extremely small quantities to drugs or naturally occurring physiologically active materials, in body fluids, such as blood, urea and saliva, exemplifies the vast array of situations in which determinations of minute quantities of material are required.

More specifically, both as a medical and police function, the abuse of narcotics and drugs requires an easy method for rapid detection of the use of such drugs, either immediately after ingestion or injection or frequently, after a relatively extended period. The assay should be effective either for the drug, its metabolite, or both, individually or together, and should be specific for the drug being assayed, and not be interfered with by other materials which may be present in the body fluid.

Where the body is malfunctioning, it may be important to assay for particular compounds or metabolites, so as to diagnose the particular malfunction. Also, in case of poisonings, an easy and rapid method for determining the toxin, could be extremely important in providing the antidote.

A wide variety of methods exist for analyzing for a broad of different organic compounds. Many of these methods are dependent upon different types of detection instruments, such as fluorometers, ultraviolet spectrophotometers. gravimetric analyses, titrimetric analyses, etc. Other methods depend on thin layer chromatography, which is frequently slow, is subject to interference, and may not be reproducible. Because of the significant differences in the procedures, accuracies, and the presence of interfering materials, many diagnostic tests cannot be routinely carried out because of expense and lack of equipment.

2. Description of the Prior Art

The use of free radical probes with naturally occurring materials is found in U.S. Pat. Nos. 3,489,522 and 3,453,288. Labeling of various high molecular weight proteins is described in U.S. Pat. No. 3,481,952. See also Hubbell, et al., Proc. Nat Acad. Sci. U.S., 61, 12 (1968). Organic free radicals have been joined with antibodies and studied. L. Stryer and O. Hayes Griffith, Proc. Nat. Acad. Sci. U.S. 54, 1785 (1965); and J.C. Hsia and L.H. Piette, Arch. Biochem. and Biophys., 132, 466 (1969). In the latter reference, dinitrophenyl antibodies were labeled with 2,4-dinitrophenyl spin labels and the changes in the electron spin resonance (ESR) spectrum were observed as a result of the interaction between the labels and antibodies.

Steroids have been spin labeled by either preparing the oxazole of the 3-keto steroid and oxidizing the nitrogen to the nitroxide or using a carboxyalkyl at the 17 position to form the amide of a tetramethyl(amino)-piperidino-oxyl group. See McConnel, et al., Quart. Rev. of Biophys., 3 91–136 (1970); and Hamilton, et al., Structural Chemistry and Molecular History, W. H. Freeman & Co., San Franciso, California (1968), the chapter on spin labels. See also Hubbell, Proc. Nat. Acad. Sci. U.S. 63, 16 (1963).

See also copending application Ser. No. 794,008, filed Jan. 27, 1969, now abandoned, which discloses the use of nitroxide free radical compounds in determining the changes in pH.

SUMMARY OF THE INVENTION

Spin labeled compounds (ligand analogs) are provided for use in immunoassays. Biologically active compounds or structural analogs are modified and coupled with a stable free radical compound, so as to provide a ligand analog which: (1) is recognized by a receptor molecule, ordinarily an antibody, and (2) can compete with a biologically active molecule (ligand) for the receptor site in a manner which permits the biologically active molecule to be assayed.

Particularly, biologically active compounds are functionalized or available functional groups employed to link with a stable free radical compound, usually a cyclic nitroxide. The manner of functionalizing and linking to the stable free radical compound provides a product which binds to the receptor specifically and has a binding constant which alllows for effective competition with a ligand. Changes in spectrum between ligand analog bound to receptor and unbound ligand analog rotating free in solution permit a quantitative determination of the amount of ligand present, since the ratio of bound to unbound ligand analog is affected by the amount of ligand present in the solution.

The ligands of the subject application are methadone and methadone analogs.

DESCRIPTION OF THE SPECIFIC EMBODIMENTS

The compounds of this invention referred to as ligand analogs have three essential parts: (1) a group of atoms forming a moiety recognizable by a receptor and when joined to the other parts, the total has a binding constant to a receptor, which allows for competition between the subject compound and a compound to be assayed (modified ligand moiety); (2) a stable free radical group having an electron spin resonance spectrum which is capable of being detected at low concentrations and which changes in a detectable manner, when bound to a receptor, as contrasted to being unbound and free to rotate in solution (free radical moiety); and (3) a linking group, joining the modified ligand moiety to the free radical moiety, which cooperates with the other parts of the molecule in allowing or enhancing the capability of the moieties joined by the linking group to fulfill their function.

The first part will substantially resemble at least a part of the ligand to be assayed. Usually, the ligand to be assayed will be modified to only a minor degree, for example, by replacement of a proton with a divalent chain, having the other valence bonded to the free radical moiety. However, major changes may be employed, as in the case of a polypeptide where only a portion of the polypeptide may be used for the ligand analog.

The linking group may be simply a single or multiple bond between the modified ligand moiety and the free radical moiety, but will normally be of at least one carbon or heteroatom.

The free radical moiety is conveniently a stable free radical, usually a nitroxide group and usually an α,α,α',α'-tetrasubstituted cyclic nitroxide group.

Ligand

It is to be understood that the various groups are chosen so as to relate to known compounds of physiological interest. The primary difference between the known compounds and the subject compounds is the linking group and the presence of the free radical moiety.

Methadone

Another group of compounds having narcotic activity is methadone and its analogs, which for the most part have the following formula:

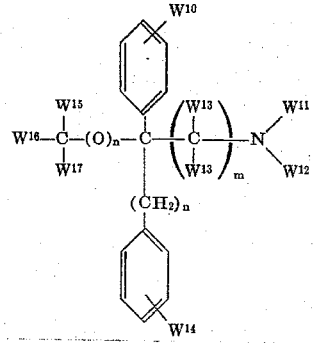

wherein:
any one of the W groups can be -X*-A* or an H of any of the W groups may be replaced by -X*-A*. X*-A* will be defined subsequently (there is only one -X*-A* per molecule);
$n$ is 0 or 1, usually being the same in both instances;
$m$ is 2 or 3;
$W^{10}$ is hydrogen;
$W^{11}$ and $W^{12}$ are hydrogen, alkyl of from 1 to 3 carbon atoms, e.g., methyl, or may be taken together to form a six-membered ring with the nitrogen atom to which they are attached, e.g., pentylene-1,5 and 3-oxapentylene-1,5;
$W^{13}$ is hydrogen or methyl, only one $W^{13}$ being methyl;
$W^{14}$ is hydrogen;
$W^{15}$ is hydrogen or hydroxyl;
$W^{16}$ is hydrogen, acyloxy of 1 to 3 carbon atoms, e.g., propionoxy, or hydroxy (when $W^{15}$ and $W^{16}$ are both hydroxy, the oxo group is intended), with the proviso that $W^{15}$ and $W^{16}$ are the same when $n$ equals 1; and
$W^{17}$ is hydrogen or alkyl of 1 to 3 carbon atoms, e.g., ethyl.

Illustrative compounds which can be marked with a free radical are methadone, dextromoramide, dipipanone, phenadoxone, propoxyphene (Darvon) and acetylmethadone.

Preferred compounds are when $W^{11}$ or $W^{17}$ is -X*-A*.

A narrower class of methadone and its analogs are of the formula:

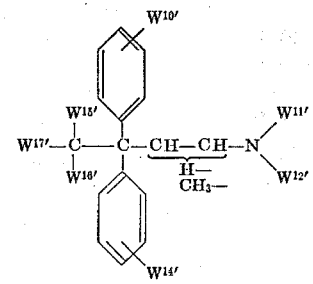

wherein:
any one of the W groups can be -X*-A* or an H of any of the W groups can be replaced by -X*-A*. X*-A* will be defined subsequently (there is only one -X*-A* per molecule);
$W^{10'}$ and $W^{14'}$ are hydrogen;
$W^{11'}$ and $W^{12'}$ are methyl or are taken together with the nitrogen atom to which they are attached to form a morpholino or piperidine ring;
$W^{15'}$ and $W^{16'}$ are hydrogen, hydroxy, acetoxy, at least one being hydroxy or acetoxy; and
$W^{17'}$ is alkyl of from 1 to 3 carbon atoms.

The methadone derivatives will for the most part have the following formula:

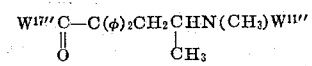

wherein one of $W^{11''}$ or $W^{17''}$ is -X*-A*;
when other than X*-A*
$W^{11''}$ is methyl; and
$W^{17''}$ is propyl;
$\phi$ is phenyl;
X* is —ZCONH, wherein Z is hydrocarbylene of from 1 to 7 carbon atoms, preferably aliphatic, having from 0 to 1 site of ethylenic unsaturation; and
A* is of the formula:

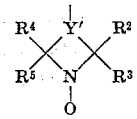

wherein $R^{2-5}$ and $Y'$ have been defined previously.

The metabolities of methadone and close analogs will for the most part have the following formula:

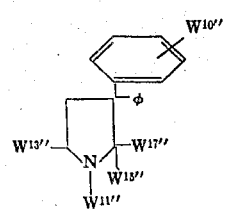

wherein:
any one of the W groups can be -X*-A* or an H of any of the W groups can be replaced by -X*-A*. X*-A* will be defined subsequently (there is only one -X*-A* per molecule);

$\phi$ is phenyl;
$W^{10''}$ is hydrogen;
$W^{11''}$ is hydrogen, methyl, or a free valence joined with $W^{15''}$;
$W^{13''}$ is hydrogen or methyl;
$W^{15''}$ is hydrogen, hydroxy, or taken together with $W^{11''}$ forms a double bond between the nitrogen atom and the carbon atom to which $W^{11''}$ and $W^{15''}$ are respectively attached; and
$W^{17''}$ is alkyl of from one to three carbon atoms, usually two carbon atoms.

Illustrative compounds which may be linked to a free radical compound include phenylbenzyl(1-dimethylamino-2-propyl)methyl succinate, phenylbenzyl(1-dimethylamino-2-propyl)methyl oxalate, diphenyl(2-dimethylamino-1-propyl)methyl maleate, 0-carboxymethyl 4,4-diphenyl-7-dimethylamino-2-heptanone oxime, 4,4-diphenyl-7-dimethylamino-3-octyl succinate, N-(2,2-diphenyl-3-methyl-4-morpholinobutyryl)glycine, 3-ethyl-4,4-diphenyl-6-dimethylamino-hept-2-enoic acid, 6-keto-7,7-diphenyl-9-diphenyl-9-(dimethylamino)decanoic acid, N-carboxymethyl 2-ethyl-3,3-diphenyl-5-methylpyrrolidine.

Of course, many of the compounds which are of interest undergo metabolic changes, when introduced into a vertebrate. The particular physiological fluid which is tested may have little, if any of the original compound. Therefore, the original presence of the compound might only be detectable as a metabolite. In many instances, the metabolite may be the glucuronide, either oxy or oxo derivative of the original compound. In other instances, the original compound may have undergone oxidation, e.g., hydroxylation, reduction, acetylation, deamination, amination, methylation or extensive degradation. Where the metabolite still retains a substantial portion of the spatial and polar geometry of the original compound, it will be frequently possible to make the ligand analog based on either the original compound or metabolite. Where the metabolit is distinctively different than the original compound, the ligand analog will be based on the metabolite.

Since many of the biologically active materials are active in only one stereoisomeric form, it is understood that the active form is intended or the racemate, where the racemate is satisfactory and readily available. The antibodies will be specific for whatever form is used as the hapten.

Free Radical Group (A)

The free radical group is a stable free radical, preferably one which has a fairly simple electron spin resonance spectrum, which can be conveniently bonded through a linking group to the ligand. Various stable free radicals may be used, such as verdazyls, diarylamino radicals, aroxyl radicals, and nitroxide radicals. See Forrester, Organic Chemistry of Stable Free Radicals, Academic Press, New York (1968).

In the subject invention, the most versatile compounds are the nitroxide radical compounds, wherein the nitrogen of the nitroxide group is a heteroannular member. These compounds may be mono-or bicyclic, fused or unfused, and will normally be of from 7 to 36 carbon atoms, more usually of from 7 to 16 carbon atoms, wherein the annular members will normally be of from 4 to 9. The compounds may have from 0 to 2 other heteroannular members, more usually from 0 to 1, which are oxygen, nitrogen or sulfur. The nitrogen and sulfur may be bonded to oxygen: nitrogen to one oxygen atom, and sulfur to from 0 to 2 oxygen atoms, more usually 0 or 2. The compounds will normally have from 0 to 1 site of endo ethylenic unsaturation.

A special group of nitroxide compounds are the monoaryl and diaryl nitroxides, where the ortho and para positions are substituted, usually with alkoxy groups, in order to inhibit reaction between the two nitroxide compounds. In the monoaryl nitroxide compound, the other valence of the nitrogen will be bonded to a tertiary carbon atom.

The nitroxide compounds which find use in this invention will have the following formula:

wherein:
$\alpha$ and $\alpha'$ are organic radicals, which are incapable of forming a double bond to nitrogen without a substantial change in structure and are either aryl, normally trialkoxyaryl, tertiary alkyl, or may be taken together with the nitrogen to which they are attached to form a mono-or bicyclic ring of from 4 to 9 annular members.

For the most part, the compounds which will be employed will have the following formula:

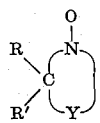

wherein:
R and R' are hydrocarbon groups of from 1 to 12 carbon atoms, more usually from 1 to 6 carbon atoms, and preferably alkyl of from 1 to 3 carbon atoms; and Y is a divalent functionality of from 3 to 27 atoms other than hydrogen, more usually of from 3 to 12 atoms other than hydrogen, having a total of from 0 to 2 heteroatoms; oxygen, nitrogen or sulfur, which are annular members; Y forms a ring of from 4 to 6 annular members with the carbon and nitrogen atoms to which it is attached. One of the hydrogen atoms bonded to carbon, usually an annular carbon atom, will be replaced so as to provide a site for linking to the ligand.

Y will be bonded to the nitrogen of the nitroxide through carbon, the carbon atom being free of hydrogen or being sterically prevented from forming a double bond to nitrogen, e.g., by an endo double bond.

One preferred group of free radical compounds has the following formula:

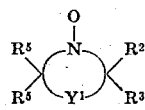

wherein $R^{2-5}$ are the same or different, preferably the same, and are hydrocarbon of from 1 to 12 carbon atoms, more usually of from 1 to 6 carbon atoms, preferably alkyl and particularly preferred methyl; $Y^1$ is a divalent radical having from 1 to 10 carbon atoms, more usually 1 to 4 carbon atoms and from 0 to 1 heteroatoms, there being from 1 to 3 annular members, usually carbon; $Y^1$ may have from 0 to 1 site of ethylenic unsaturation and preferably will form a pyrroline, pyrrolidine, or piperidine ring. The heteroatoms will normally be nitrogen, oxygen and sulfur.

A subgenus of the monocyclic nitroxide is the five membered ring having one annular heteroatom of the following formula:

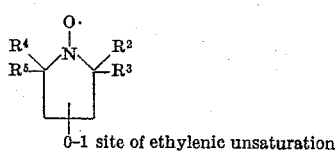

0–1 site of ethylenic unsaturation with $R^{2-5}$ defined as above.

Another subgenus is the six-membered ring compounds which have the following formula:

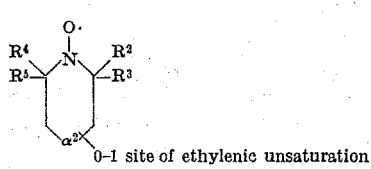

0–1 site of ethylenic unsaturation wherein $R^{2-5}$ are as defined above, and $\alpha^2$ is carbon or nitrogen.

The five-membered rings having two annular heteroatoms will for the most part have the following formula:

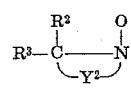

wherein $Y^2$ is

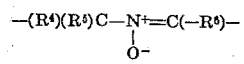

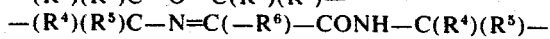

wherein $R^{2-5}$ are as defined above, $R^6$ and $R^7$ may be the same as $R^{2-5}$ or hydrogen.

A preferred nitroxide free radical containing group of compounds has the following formula:

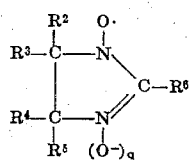

wherein $q$ is 0 or 1, preferably 1, when $q$ is 1, the nitrogen to which oxygen is bonded is positive, $R^{2-5}$ have been defined previously, and $R^6$ is as defined above.

Illustrative rings include 1-oxylpiperidine, 1-oxylpyrrolidine, 1-oxylpyrroline, 1-oxylimidazolidine, 1-oxyl-3-oxyimidazolidine, 1-oxyltetrahydropyridine and 3-oxyloxazolidine.

The bridgehead nitroxide compounds will for the most part have the following formula:

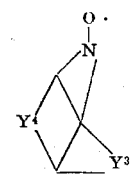

wherein:

$Y^3$ and $Y^4$ are divalent aliphatic hydrocarbon radicals having from 0 to 1 site of ethylenic unsaturation and of from 2 to 3 carbon atoms.

The last nitroxide to be specifically considered is the aryl nitroxide which will have the following formula:

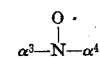

wherein:

$\alpha^3$ is 2,4,6-trialkoxy benzene, wherein the alkoxy groups are of from 1 to 3 carbon atoms and $\alpha^4$ is the same as $\alpha^3$ or tertiary alkyl of from 4 to 12 carbon atoms, more usually of from 4 to 6 carbon atoms.

The verdazyls will for the most part have the following formula:

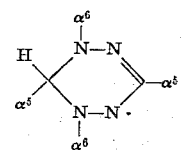

wherein:

$\alpha^5$ is hydrocarbon or a acyloxy of from 1 to 8 carbon atoms and $\alpha^6$ is aryl or substituted aryl, e.g., hydroxy or amino of from 6 to 10 carbon atoms.

As already indicated, the free radical group is bonded to the ligand through a bond or linking group which is substituted on the free radical group by replacing one of the hydrogen atoms. In addition, sharper spectra can be obtained by replacing hydrogen atoms with deuterium atoms. It is therefor, to be understood when hydrogen is spoken of in referring to the free radical group, that deuterium is to be treated as an equivalent.

In carrying out the subject invention, particularly where the ligand does not have a naturally occurring receptor or it is found to be more convenient to prepare antibodies, the ligand will be modified by providing a group which can be bonded to a protein. Therefore, some reactive functionality will be introduced into the ligand, either by activating a functionality which is present, e.g., by transforming a carboxylic acid to a mixed anhydride, or by introducing a new functionality, e.g., modifying a hydroxy group with a carboxymethyl group. Since the antibodies which are formed will recognize the ligand with its attached linking group, that was employed in preparing the antigenic material, normally the same ligand with its attached linking group used to prepare the antigenic material will also be used to bond to the free radical group. Therefore, most commonly, the substituents on the free radical group will be the relatively simple substituents such as amino, hydroxy and carboxy.

Illustrative compounds which will be used for linking to the ligand are 1-oxyl-3-amino-2,2,5,5-tetramethylpyrrolidine, 1-oxyl-3-hydroxy-2,2,5,5-tetramethylpyrrolidine, 1-oxyl-3-carboxyl-2,2,5,5-tetramethylpyrrolidine, 1-oxyl-3-carboxy-2,2,5,5-tetramethylpyrroline, 1-oxyl-4-amino-2,2,6,6-tetramethylpiperidine, 1-oxyl-4-hydroxy-2,2,6,6-tetramethylpiperidine, 1-oxyl-4-carboxy-2,2,6,6-tetramethyltetrahydropyridine, 2-methylamino-1,3-dioxy-4,4,5,5-tetramethylimidazoline, 2-hydroxymethyl-1,3-dioxy-4,4,5,5-tetramethylimidazoline and 1-amino-7-oxyl-7-azabicycloheptane.

In many instances, it may be advantageous to have a reactive group on the free radical group and bond that to the ligand. Whenever possible, this group would provide the same type or possibly even the same functional bridge to the ligand. In effect, it could merely be the reverse situation, the final compound being the same as if the linking group had been present in reverse on the ligand. For example, if there is an amino group on the ligand, it would be possible to modify the ligand group so as to form an isocyanate. Similarly, if there is an amino group on the free radical, it is also possible to modify that amino group to form an isocyanate. The bridge will be the ureylene, irrespective of which procedure was used.

Illustrative compounds which can be used for linking the free radical functionality to the ligand are 1-oxyl-2,2,5,5-tetramethyl-3-isocyanatopyrroline, 1-oxyl-2,2,5,5-tetraethyl-3-isothiocyanatopyrrolidine, N-(1-oxyl-2,6-dimethyl-2,6-dibenzylpiperidin-4-yl) succinamic acid, N-(1-oxyl-2,2,5,5-tetraethylpiperidin-4-yl) maleamic acid, N-(1-oxyl-2,2,5,5-tetrabutylpyrrolidin-3-yl) oxalamic acid, mono-(1-oxyl-2,2,5,5-tetramethylpiperid-4-yl) fumarate, N-(1-oxyl-2,2,5,5-tetramethylpiperid-4-yl) glycine, 1-oxyl-2,2,5,5-tetramethylpyrrolid-3-ylsulfonylacetic acid, 1-oxyl-2,2,5,5-tetramethyl-3-hydroxypyrrolidine, 1-oxyl-2,2,5,5-tetramethylpyrrolin-3-ylcarboxylic acid, N-(1-oxyl-2,2,5,5-tetramethylpyrrolidin-3-yl) terephthalamic acid, 1-oxyl-2,2,5,5-pyrrolidin-3-yl malonate, 1-oxylpyrrolin-3-yl-3,5-dispiro-(1'-cyclopentane) carboxylic acid, 4,4,5,5-tetramethyl-1,2,3-trioxyimidazoline, 4,4,5,5-tetrapropyl-2-bromomethyl-1-oxyl-3-oxide-imidazoline, 4,4,5,5-tetrabenzyl-2-(p-aminophenyl)-1-oxyl-3-oxide-imidazoline, 4,4,5,5-tetramethyl-2-chlorosulfonylmethyl-1-oxyl-3-oxide-imidazoline, 4,4,5,5-tetramethyl-2-carboxymethyl-1-oxyl-3-oxide-imidazoline, 5,6-dimethyl-4,5-(butylene-1,4)-2-isocyanatomethyl-1-oxyl-imidazoline, 4,4,5,5-tetramethyl-2-carboxycarbonyl-1-oxyl-3-oxide-imidazoline, and 2-chlorocarbonyl-1-oxyl-3-oxide-imidazoline-4,5-dispiro(1'-cyclohexane).

Linking Groups

The group -X*- will vary depending on the available sites for attachment on A*. For the most part, the available groups on the ligand, either naturally present or introduced, will be hydroxyl (—OH); amino

where $R^8$ will usually be hydrogen or alkyl of from 1 to 6 carbon atoms); mercapto (—SH); oxo (—C=O); carboxy (—CO$_2$H); and methine ($\equiv$CH), where the H is bonded, usually to an aromatic carbon atom and preferably the ring is activated by oxy or amino substituents.

The primary function of the linking group is to bond the free radical to the ligand within a relatively short distance of each other. However, the linking group may also be used to fulfill other functions, such as to modify the solubility properties of the final product. Particularly, when relatively large hydrophobic groups are employed, as in steroids, a group capable of forming a salt may be introduced into the linking group. Illustrative groups are carboxylates, sulfonates, sulfates and quaternary ammonium salts. The counter ion may be any convenient ocunter ion, preferably monovalent, such as chloride, fluoride, alkali metal salt, ammonium etc.

The linking group will be of from 1 to 30 atoms, consisting solely of carbon, hydrogen, nitrogen, oxygen, phosphorus and sulfur and will usually be of from 0 to 8 carbon atoms, more usually of from 0 to 6 carbon atoms and from 1 to 8 heteroatoms, more usually of from 1 to 6 heteroatoms which are oxygen, sulfur and nitrogen, more usually oxygen and nitrogen. Any counter ion to a salt forming group is not to be counted in the number of hetero atoms. The preferred groups are the non-oxocarbonyl or thiocarbonyl, alkylamino or alkoxy as linking functionalities.

The chain length of the linking groups is preferably from 1 to 10 atoms, usually 2 to 6 atoms or the equivalent, when cyclic structures are involved.

A linking group that finds particular use is the hydrocarbylcarboxamido or oxyhydrocarbylcarboxamido of from 2 to 8 carbon atoms, usually of from 2 to 6 carbon atoms and from 0 to 1 site of aliphatic unsaturation. Usually the hydrocarbylene is aliphatic and will be represented by Z in the following formulas.

The following tabulation indicates the various linking groups, varying with the functionalities present on the ligand and the free radical.

| Ligand | Free radical |
|---|---|
| (Hydroxyl (-O-); amino (-N(R$^9$))-- | (Hydroxyl (-O-); amino (-N(R$^9$)). |

$$-\overset{T}{\underset{\|}{C}}-$$

$$-\overset{T}{\underset{\|}{C}}-Z-\overset{T}{\underset{\|}{C}}-$$

$$-Z-\overset{T}{\underset{\|}{C}}-$$

$$-\overset{T}{\underset{\|}{C}}-Z-$$

$$-SO_2-Z-SO_2$$

$$-\overset{T}{\underset{\|}{C}}-Z-SO_2$$

$$-SO_2-Z-\overset{T}{\underset{\|}{C}}$$

$$-Z-SO_2$$
$$-SO_2-Z$$
$$=Z'-$$
$$-Z-$$

wherein:
R⁹ is hydrogen or hydrocarbon of from 1 to 6 carbon atoms;
T is oxygen, sulfur, or NR', wherein R' is hydrogen or hydrocarbon of from 1 to 6 carbon atoms, usually H; T is usually oxygen;
Z' is alkylidenyl
Z is a bond; hydrocarbon of from 1 to 10 carbon atoms, more usually alkylene of from 1 to 6 carbon atoms, alkenylene of from 2 to 6 carbon atoms, alkynylene of from 2 to 6 carbon atoms, cycloalkylene of from 4 to 10 carbon atoms, arylene of from 6 to 10 carbon atoms, oxaalkylene of from 4 to 8 carbon atoms, and azaalkylene of from 4 to 8 carbon atoms.

When the linking functionality is hydroxyl, Z or a nonoxocarbonyl bond to the hydroxy is preferred, particularly Z.

When the linking functionality is amino, nonoxocarbonyl, the sulfur and nitrogen analogs, or Z are preferred, particularly nonoxocarbonyl.

| Ligand | Free radical |
|---|---|
| (Oxocarbonyl (—$\overset{\mid}{C}$=O)) | (Hydroxy (—O—); amino (—N(R⁹)—). |
| | =N—O—Z |
| | =N—O—Z—CT |
| | =N—O₂CZCT— |
| | =CHCH— |
| | =NNH—Z—CT |

| Ligand | Free radical |
|---|---|
| (Nonoxocarbonyl (—$\overset{O}{\underset{\parallel}{C}}$—)) | (Hydroxy (—O—); amino (—N(R⁹)—). |
| | —O—Z—CT |
| | —N(R⁹)—Z—CT— |
| | —N(R⁹)—Z— |
| | —O—Z— |

| Ligand | Free radical |
|---|---|
| (Methine (≡CH)) | (Hydroxy (—O—); amino (—N(R⁹)—). |
| | —N₂—Z"— |
| | —N₂—Z"—CT— | wherein Z, T, and R⁹ are as defined previously and Z" is arylene of from 6 to 10 carbon atoms.

Where the free radical group has a carboxy functionality (nonoxocarbonyl), the groups would then be

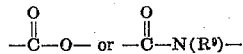

where the oxygen and nitrogen are bonded to any of the linking groups indicated above, and where Z or Z" is bonded to the oxygen or nitrogen.

Where the free radical has an oxocarbonyl group and the ligand an hydroxy or amino group, one need only reverse the linking group for the oxocarbonyl on the ligand and hydroxy or amino on the free radical group.

While for the most part, the free radical functionality may be bonded to any convenient position of the ligand, either through a functionality naturally present in the ligand or one introduced synthetically, there are preferred methods of bonding the free radical functionality to the ligand. First, it should be recognized that the free radical substituted ligand need not have any biologic activity. One is solely concerned in not disturbing the geometry and polar site relationships of a substantial portion of the molecule. Therefore, assuming synthetic convenience, the free radical functionality will normally be introduced at one end of the molecule.

Also, it may be found that better binding with a receptor is achieved by having the free radical functionality bonded to one site rather than another site. This can be readily determined by preparing a number of free radical modified ligand compounds and determining their equilibrium concentration with the receptor. This is particularly true where the ligand is a hapten. Almost invariably, the site of the ligand, and usually the linking group, will be the same for bonding the ligand to the protein as the ligand to the free radical. In this way, that portion of the ligand molecule which extends from the protein and is the most likely portion of the molecule to provide a template for the antibodies, is the same portion of the molecule which remains unmodified by the linking group to the free radical group.

For an excellent discussion of linking groups for steroids, for conjugation to proteins, see Peron, et al., Immunologic Methods in Steroid Determination, Appleton, Century Crofts, New York 1970.

RECEPTOR

In the subject invention, for the most part, the receptors will be macromolecules which have sites which recognize specific structures. The recognition of the specific structures will be based on van der Waals forces, which provide a specific spatial environment which maximizes the van der Walls forces; dipole interactions, either by permanent or induced dipoles; hydrogen and ionic bonding; coordinate covalent bonding; and, in some cases, covalent bonding. For a detailed discussion of mechanisms by which receptors bond ligands, see Goldstein, et al., Principles of Drug Action, Harper and Rowe, New York 1968.

The macromolecules of greatest interest are proteins and nucleic acids which are found within cells, blood, and other biological fluids. These compounds include enzymes, antibodies, ribonucleic acid (RNA) and deoxyribonucleic acid (DNA), carrier proteins, such as transcortin, thyroid binding globulin (TBG), thyroid binding prealbumin (TBP), and "bound" receptors (that is, receptors bound to cell membranes).

The most convenient group of proteins for use in the subject invention are antibodies. These materials are conveniently used in the analysis of the category of ligands referred to as haptens. Antibodies are produced by introducing an immunogenic substance into the bloodstream of a living animal. The response to the introduction of the immunogenic substance or antigen is the production of antibodies which act to coat the antigen and detoxify it or precipitate it from solution. The antibodies form a coat which is geometrically arranged so as to fit the spatial arrangement of the antigen. This may be analogised to a lock and key. The interaction is normally reversible, in that the antigen is subject to displacement or removal by various means without destruction of the receptor site.

There are many materials which are antigens and will produce an immunogenic response by being introduced into the bloodstream of a mammal. However, a number of materials of interest are not antigens, but are haptens, and in that situation, an extra step in preparing the antibody is required. This method of preparing antibodies with materials other than antigens is well known and may be found in Microbiology, Hoeber Medical Division, Harper and Rowe, 1969. See also, Landsteiner, Specificity of Serological Reactions, Dover Publications, N.Y. 1962; Kabat, et al., Experimental Immunochemistry, Charles C. Thomas, Springfield, Illinois, 1967; and Williams, et al, Methods in Immunology and Immunochemistry, Vol. I, Academic Press, New York, 1967.

The material which is to be assayed is bonded to a protein by any convenient means and the modified protein introduced into the bloodstream. The same type of bonding groups used with the free radical attachment to the ligand may be employed. The antibodies which form will include groups of antibodies which are shaped to fit the foreign moiety (hapten) bonded to the protein. Therefore, antibodies are obtained which are specific to the compound or hapten bonded to the protein. By careful separation techniques, the antibodies primarily concerned with the hapten in question, can be concentrated so as to provide an antibody composition which is primarily related to the specific hapten which was bonded to the protein.

To illustrate this method, para-aminobenzene arsonate is diazotized to form the diazo salt. By combining the diazo salt with rabbit globulin, the rabbit globulin is labeled with para-azobenzene arsonate. By introducing this composition into the bloodstream of an animal other than a rabbit, for example, a sheep, antibodies can be formed which will have a spatial arrangement which recognizes the azobenzene arsonate.

If desired, the antibodies may be bonded to a variety of supports. The bonding may be carried out similarly to that employed for bonding the protein to a ligand. Various supports include polyacrylamides, copolymers of vinyl acetate and acrylic acid, polyvinyl esters, modified cellulose, Agarose, Sepharose, etc. The value of the support, is that the antibody may be easily separated from the solution in this manner and the clear solution analyzed. Therefore, the spectrum resulting from any of the radical absorbed on the antibody will not be present in the assay. An illustrative support is para-aminobenzamidoethyl-Bio-Gel P-60 supplied by Bio-Rad Laboratories of Richmond, California.

METHOD

The method employing the compounds of this invention is concerned with determining the amount of a specific material—"ligand"— in a solution by bringing together a high molecular weight material having a site characteristic of the polar nature and spatial geometry of the ligand to be determined—"receptor"— and a free radical analog of the ligand—"ligand analog"—. The electron spin resonance spectrum of the free radical functionality will vary when associated with a relatively small molecule, as compared to being associated with a substantially larger molecule. In a solution containing only ligand analog and receptor, at equilibrium the receptor sites will be substantially filled with ligand analog. Upon adding a small amount of ligand to the solution, the ligand and ligand analog will compete for the deficiency of receptor sites, affecting the position of the equilibrium and the appearance of the spectrum. By using known amounts of ligand, the effect on the equilibrium can be readily determined, as seen by the change in the electron spin resonance spectrum. Once the standards have been calibrated, various devices can be employed which will provide a reading indicating directly the amount of the unknown material.

In carrying out the assay, three basic reagents are involved: the unknown or ligand; the free radical analog; and the receptor. The free radical analog and the receptor are conveniently prepared as reagent solutions, with additional reagents, as required, being in one or both of the solutions. Reagents may be transported either dry or in solution. Liquids are convenient for the transfer of small amounts of materials, since they are readily metered.

Polar solvents will normally be used, particularly hydroxylic solvents, such as water and aqueous alkanols of from 1 to 2 carbon atoms (methanol and ethanol). Other oxygenated solvents may also be employed, such as ethers, esters, dimethyl formamide, dimethyl sulfoxide, hexamethyl phosphoramide, etc., usually in combination with water in amounts of 0 to 40, more usually 1 to 30 volume percent.

In carrying out the assay, the dilution factor for each reagent will usually be 1.5 to 10, more usually 1.5 to 5. Therefore, the original concentration of the reagent in the reagent solution will to some extent anticipate the final concentration of the reagent in the assay.

The concentration of the receptor in the reagent solution will usually be in the range of $10^{-9}$ to $10^{-3}$ M, preferably $10^{-7}$ to $10^{-3}$ M, based on active sites. (The method of determination of active sites will be described in the experimental section.) Usually, this will roughly be about $10^{-4}$ to 100 mg/ml, more usually, about $10^{-2}$ to 10 mg/ml. For the assay, the concentration of receptor sites, should be about $10^{-3}$ to $10^{-9}$ M, more usually $10^{-4}$ to $10^{-8}$ M.

The molar concentration ranges for the ligand analog will parallel those of the receptor, both as to the reagent solution and as to the assay concentration. The ratio of ligand analog to receptor will usually be from 0.5 to 10, more usually 0.5 to 3 molecules per receptor site. The ratio will be governed by the binding constants, the method of determination, the suspected concentration of ligand and the specificity of the assay.

Usually, it will be desirable to have the assay mixture buffered, so as to have a mixture with a pH in the range of 5.0 to 10.5, preferably 7.0 to 8.5. The concentration of buffer will vary with the buffer, usually in the reagent solution being about 0.05 to 0.8 M, more usually 0.2 to 0.7 M. The more acid the unknown solution, the higher the pH of the reagent solution which is used. In the assay mixture, the buffer concentration will usually be about 0.1 to 0.6 M.

The choice of buffer will vary widely, depending on its effect on the reagents, e.g., solubility, inertness to the reagents, etc. Various buffers which are commonly used include tri(hydroxymethyl)methyl amine (Tris); alkali metal and ammonium borates, e.g., sodium borate; alkali metal and ammonium phosphate e.g., sodium and disodium phosphate; alkali metal bicarbonate and carbonate, e.g., sodium bicarbonate and carbonate; ethylenediaminetetraacetic and, amine diols in combination with their salts, e.g., 2-amino-2-methyl-1,3-propandiol hydrochloride; ammonium chloride-ammonium hydroxide combination; barbital-alkali metal barbital combination; heterocyclic amines in combination with their salts, e.g., collidine-hydrochloric acid, collidine-pyridine-acetic acid, ethanolamine-hydrochloric acid, N-ethylmorphinepyridine-acetic acid, glycine-hydrochloric acid, piperazine-glycylglycine, etc. The preferred buffers are Tris, bicarbonate-carbonate, phosphate and borate. With the inorganic buffers, it is frequently convenient to neutralize the inorganic acid, e.g., boric acid, with an alkali metal base, e.g., sodium hydroxide, to the desired pH.

Other salts or reagents may also be present in the reagent solution, as required.

In some instances, pretreatment of the unknown substrate may be required. Where the unknown is suspected of containing a reductant, e.g., ascorbic acid, which is capable of reducing the free radical, the unknown substrate may be treated with an oxidizing agent, such as sodium dichromate, sodium perborate, sodium periodate, iodine, etc. The choice of oxidizing agent will be governed by its effect on the other reagents which will be present in the assay. Alkali metal dichromate, particularly sodium dichromate and sodium hypoiodite, are oxidants of choice. The amounts of oxidant will be governed by the suspected amount of reductant. With urine, concentrations of $10^{-1}$ to $10^{-3}$ M will usually suffice.

The order in which the reagents are brought together will be relatively arbitrary, governed to some degree on the interaction between the free radical ligand analog and the receptor. Therefore, the free radical ligand analog may be used bound to the receptor, and the unknown solution added. Or, the unknown solution and free radical ligand analog may be added simultaneously to compete for the sites on the receptor. In some instances, the ligand may first be bound to the receptor, and the ligand analog added. Any of these methods can be accurately calibrated and used for determination of a particular ligand. When convenient, the solution may be separated from the receptor, and the concentration of the free radical ligand analog in the solution determined. This can also be related to the unknown ligand concentration.

The solutions are mixed to provide reasonable homogeneity and, if necessary, transferred to an electron spin resonance sample holder. The holder is then introduced into an electron spin resonance spectrometer cavity. The temperature in the cavity is normally maintained in the range of about 15° C to 40° C, and the change in the spectrum metered. Depending on the method of standardization and method of calibration, one or more points may have to be determined in order to determine the concentration of the unknown ligand.

Extremely small volumes are employed for the determination, usually in the range of 10 to 100 $\mu$l for the total volume of reagents and unknown. The amount of unknown ligand that is required will normally be in the range of about $10^{-5}$ to $10^{-15}$ moles, more usually $10^{-7}$ to $10^{-13}$ moles.

A modification, which adds and additional procedural step, is to have the receptor bound to a support. This normally involves a heterogeneous system, rather than a homogeneous system. In many instances the advantageous use of the support in a heterogeneous system, more than offsets the additional effort involved in bonding the receptor to the support.

One way in which the support could be used is to pack a column (a column would probably be a small capillary tube) with the receptor bound to the support, and then bind ligand analog to the receptor. The amount of ligand analog present could be determined by measuring the electron spin resonance spectrum of the column, or preferably measuring the amount of ligand analog solution before and after passage through the column. Now, relatively large amounts of the unknown fluid could be passed through the column, followed by determining the spectrum of the column or of the effluent. The change in spectrum would be proportional to the amount of ligant in the fluid passed through the column. (Also the rate of flow if equilibrium is not established.)

Alternatively, one could mix ligand and ligand analog, with the receptor bound to the support in a tube. After equilibrium was established, by separating the receptor bound to the support from the supernatant liquid, one could measure the electron spin resonance of either or both, the support or the supernatant liquid. A further variation, would be to determine the remaining ligand analog bound to the support by addition of ligand to the support, so as to release any remaining ligand analog and to analyze for the ligand analog in solution.

In addition, supports will find particular use when a large molecule, usually in excess of 5,000 molecular weight, and more usually in excess of 10,000 molecular weight, is the ligand to be assayed. It is found, that when the free radical compound is bonded to a large molecule, significantly in excess of 5,000 molecular weight, the spin approximates that of an immobilized spin in solution. Therefore, further binding to a receptor, does not significantly change the spin of the free radical. It is thus appropriate to bind the receptor to the support, carry out the assay by adding ligand analog and ligand to the support and then determining the amount of ligand analog in a solution and/or on the support. In this instance, one is not determining the change in electron spin resonance spectrum due to change of immobilized spin to mobilized spin, but rather the absolute number of free radical groups which are present.

In order to demonstrate the broad spectrum of compounds which may be assayed, a number of different haptens of distinctively different structure and polar nature were used and bonded in a variety of ways to different nitroxide containing radical compounds. These compounds are not antigens and were therefore bonded to proteins which are then used for the formation of antibodies. The antibodies are shown as being used both with and without supports.

EXPERIMENTAL

The following examples are offered by way of illustration and not by way of limitation.

(All the temperatures are reported in Centigrade.)

EXAMPLE A

Preparation of Rabbit Serum and $\gamma$-Globulin

Antisera may be obtained as follows: The antigen (hapten coupled to an appropriate protein) is made up in a saline solution (9 g/liter) at a 2 mg/ml concentration. Per 1.0 ml aliquot of the above solution introduced, there is introduced simultaneously 3 ml of Complete Freund's Adjuvant in homogenized form by means of a two-way needle. For subcutaneous injections, approximately 0.3 ml (antigen + Freund's solution) is injected per site and for intraperitonealy injections, approximately 0.4 ml is injected. The total dosage is about 4.0 ml per rabbit.

After 3 to 4 weeks, a booster shot is given intramuscularly consisting of 0.5 ml of the above saline solution and 0.5 ml of complete Freund's Adjuvant. A period of 5 to 7 days is allowed to pass and the rabbit is bled by heart puncture.

When the desired amount of blood is collected, the blood is allowed to clot and the clot removed. The remaining solution is then centrifuged at 2,000 rpm for 10 minutes. The serum is collected free of loose red cells.

An equal volume of saturated ammonium sulfate solution is added to the serum dropwise with stirring at 4°. After standing for 1 hours at that temperature, the solution is centrifuged at 10,000 rpm for 15 minutes and the supernatant removed. The residue is suspended in as small a volume as possible of 1X PBS (phosphate buffered saline, see below for description), transferred to a dialysis bag and dialyzed overnight against 1X PBS pH 7.0. The residue in the dialysis bag is then isolated and frozen.

(To make 1 l. of 10X PBS combine 76.5 g NaCl, 7.25 g $Na_2HPO_4$ (anh.), 2.12 g of $KH_2PO_4$ and 10.0 g of $NaN_3$; make up to 1 liter with distilled water, and adjust pH to 6.5 with 1N HCl. The 1X PBS is obtained by diluting 10X (tenfold), the pH changing to 7.9–7.1 as a result of the dilution.)

EXAMPLE B

Isolation of Antibodies

In 20 ml of dimethyl formamide was introduced 400 mg aminoethyl-Bio-Gel-P-60 and 300 mg of carboxymethyl morphine (See Example 2.4) and 1 g sodium bicarbonate added. After stirring the suspension for two days at 4°, the suspension was filtered, the residue washed with water until the washings were neutral, and then the residue was dried in vacuum.

The resulting product was then suspended in 20 ml rabbit serum containing morphine antibodies and stirred for 4 hours at 4°. Filtration gave a residue which was resuspended in 5 ml phthalate buffer, pH 3.8 (0.1M) and stirred for 2 hours. The gel was separated by centrifugation and the supernatant liquid dialyzed against phosphate buffer, pH 7.4 (0.1M) to give a buffered solution of substantially pure antibodies. EXAMPLE C

Binding of Antibodies to Support

A. Para-aminobenzamidoethyl-Bio-Gel P-60 (50 mg) was suspended in 10 ml of water and acidified with 1N hydrochloric acid to pH 4.5. The suspension was cooled to 4° and 6 mg sodium nitrite dissolved in 2 ml water added over a period of 10 minutes. A one ml portion of $10^{-5}$ M solution of purified morphine antibodies was mixed with the above material at pH 9 while maintaining the temperature. After 40 minutes, 20 mg resorcinol was added to scavenge the remaining diazonium compound. The solid was then filtered was washed with pH 8 borate buffer.

B. The above supported morphine antibodies (50 mg) were suspended in 10 ml of pH 8 borate buffer solution $10^{-4}$ M in 4-[2'-($O^3$-morphino)acetamido]-2,2,6,6,-tetramethylpiperidino-1-oxyl and stirred for 2 hours. Filtration and washing with water gave a solid (50 mg) which showed broad ESR signals indicating the binding of the free radical labeled morphine to the receptor.

EXAMPLE 1

N-2',2',5',5'-tetramethylpyrrolidin-3'-yl-1'-oxyl 6-keto-7,7-diphenyl-9-(dimethylamino)-decanamide A. A solution of tetramethylene dibromide (32.4 g., 150 mmoles) in dry ether (150 ml.) was added to magnesium (10.9 g., 450 mmoles) in ether (80 ml.) at such a rate that the ether refluxed. The reaction was carried out under argon. After the addition was completed, the reaction mixture was boiled for one hour. A solution of 2,2-diphenyl-4-dimethylaminovaleronitrile (I), (prepared according to J. W. CUSIC, J. Am. Chem. Soc., 71 3546) (8.4 g., 30 mmoles) in dry xylene (100 ml.) was added during 30 min. at room temperature, and the mixture was stirred at 55°C. for 1 hour. The reaction mixture was cooled in an ice-water bath and $CO_2$ was passed through with fast stirring for 4 hours. Water (200 ml.) and concentrated HCl (100 ml.) were added, the magnesium filtered off, and the filtrate was refluxed for 2 hours. The cooled, clear solution was washed with ether (3 × 150 ml.) and extracted with dichloromethane (3 × 150 ml.). This extract was evaporated to dryness, and the residue dissolved in 0.5 liter of 0.5 N sodium hydroxide.

This solution was washed with ether (3 × 100 ml.), made acidic with conc. HCl (150 ml.), saturated with sodium chloride and extracted with dichloromethane (3 × 200 ml.). Evaporation of the solvent left an oil (7.55 g., 60%), 6-keto-7,7-diphenyl-9-(dimethylamino) decanoic acid hydrochloride, which moves as a single spot on TLC ($HCCl_3$:MeOH 8:2 and 7:3).

U. V. Spectrum

| 0.02% $CF_3COOH$ | |
|---|---|
| max | 293 ($\epsilon$=540); |
| | 264 ($\epsilon$=500); |
| | 259 ($\epsilon$=535); | b. The above product (1.170 g., 2.8 mmoles) and $Et_3N$ (423 μl.) were dissolved in dry DMF (5 ml.), cooled to 0°C. and treated with isobutyl chloroformate (393μl.), with stirring under $N_2$ for 1 hour. 3-Amino-2,2,5,5-tetramethylpyrrolidinyl-1-oxyl (450 mg.) was added and the reaction mixture was stirred at room temperature over night, poured into 5% $Na_2CO_3$ (40 ml.) and extracted with ether (3 × 20 ml.). The ether solution was washed with water (2 × 10 ml.) and with 19% NaCl solution (2 × 10 ml.). Evaporation of the ether left a red oil which was purified by chromatography on silica gel ($HCCl_3$ → $Et_2O$ → 50:50 $Et_2O$:acetone) to give an oil which solidified on standing. (900 mg., 62%).

Anal. Calc. for $C_{32}H_{46}N_3O_3$: C 73.80; H 8.90; N 8.06
Found: C 73.27; H 8.86; N 7.98

EXAMPLE 2

Methadone-BSA Conjugate

The decanoic acid prepared in Example 1 (0.63 g., 1.5 mmoles) and $Et_3N$(0.63 ml., 4.5 mmoles) were dissolved in dry DMF (5 ml.) at −8°C. Isobutylchloroformate (0.19 ml.) was added and the mixture was kept at 8° C. for ½ hour and at 0°c. for another ½ hour. The solution of the mixed anhydride thus obtained was added dropwise to a solution of BSA (1.4 g., 1.07 mequiv.) in a mixture of water (200 ml.), methanol (110 ml.), and sodium bicarbonate (9.2 g.), at 0°C. The mixture was stirred at 0°C. for 18 hours, dialyzed (18 hours, constant flow of dist. water) and lyophylyzed. Yield of the conjugate: 1.2 g. (some mechanical losses). The degree of conjugation was found from the UV spectrum of the conjugate (using a calibration curve) to be about 50% (35 methadone molecules per BSA).

Immunoassays

The compounds of this invention were employed in assaying for a wide variety of ligands.

While it was found that some variation in procedure was desirable with a few of the assays, for the most part, this did not go to operability but to enhance sensitivity. Also, as is well known, it was found that early harvests of antibodies were not always as good as later harvests of antibodies.

In evaluating an assay for commercial use, not only must the sensitivity for the ligand being assayed be determined, but also cross-reactivity. In some instances corss-reactivity is desirable, where a class of compounds is to be screened.

Methadone assay

Two plastic cups were employed, one cup containing 5 μl of 0.2 molar sodium dichromate and the second 5 μl of borate buffered antibody at pH 8. Sufficient buffer is present in the antibody solution to provide a final concentration of 0.18 molar. To the dichromate is added 50 μl of sample and a 20 μl aliquot is transferred from the first cup to the second cup containing the antibody solution. To the resulting solution was then added 10 μl of a solution of the spin label (prepared as described in Example 1) at a concentration of $3 \times 10^{-6}$ molar.

Fifty-five urine samples were tested according to the above procedure. The urines were collected from a methadone clinic. Only one urine which had been marked as being methadone positive by thin layer chromatography gave a negative result. Samples which indicated low methadone concentrations were run through the morphine assay to ensure that high concentrations of morphine might not be indicating a false positive.

In one urine sample, a positive reading was obtained with the methadone test which reverted to a normal background reading after three minutes. In this instance it is believed that the doner was a borderline diabetic who was taking DBI, a metabolite of which may have been oxidized under the conditions of the reaction to give an unstable radical. The results clearly indicate the excellent correlation between the subject assay and thin layer chromatography.

In variations of the test, it was found that an appropriate loading factor was 1.15:1 (spin label/antibody binding sites). Variation from this ratio resulted in decreased sensitivity. Dilution of the spin label concentration required a reduced scan speed to achieve the same results.

The following table indicates the substantial absence of cross-reactivity between methadone and structurally similar drugs.

TABLE VIII

| Compound | Conc. μg/ml | % Mobilization |
|---|---|---|
| methadone | 3.1 | 44 |
| demerol | 3.0 | 7 |
| thorazine | 3.4 | 9 |

By employing compounds of the subject invention in combination with antibodies prepared in accordance with the subject invention, a rapid and convenient method is provided for accurately determining a wide variety of biologically interesting materials. Furthermore, by contrast with prior art methods, the subject method provides a higher degree of accuracy and freedom from other interfering materials. Since the radical ligand analog can be prepared with minimum interference with spatial geometry and salient polar features of the molecule, and there is no concern with retention of the physiological activity of the molecule to be assayed, the method is extremely vertatile. In addition, reagents can be prepared and kept for long periods of time without significant change in activity or easily calibrated, and determination rapidly made without extensive manipulation or long periods of waiting. Isolation or substantial separation of the material to be assayed from other groups is generally not required. The use of radio-isotopes which are frequently dangerous and have difficulties in manipulation is avoided. Also, the subject method does not suffer from the disadvantages of the colormetric techniques, which cannot be carried out in opaque or turbid solutions. Although the foregoing invention has been described in some detail by way of illustration and example for purposes of clarity of understanding, it will be obvious that certain changes and modifications may be practiced within the scope of the appended claims.

What is claimed is:

1. A spin labeled reagent, which is a methadone or methadone analog according to the formula:

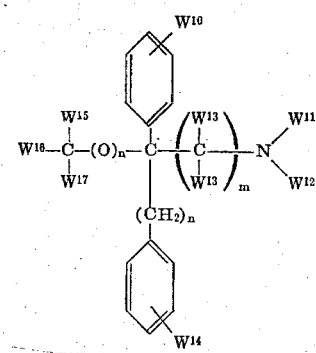

wherein:

$n$ is 0 or 1;

$m$ is 2 or 3;

$W^{10}$ is hydrogen;

$W^{11}$ and $W^{12}$ are hydrogen, alkyl of from 1 to 3 carbon atoms, or may be taken together to form a six-membered ring with the nitrogen atom to which they are attached;

$W^{13}$ is hydrogen or methyl, only one $W^{13}$ being methyl;

$W^{14}$ is hydrogen;

$W^{15}$ is hydrogen or hydroxyl;

$W^{16}$ is hydrogen, acyloxy of 1 to 3 carbon atoms, or hydroxy, with the proviso that $W^{15}$ and $W^{16}$ are both the same when $n$ equals 1, and when hydroxy oxo is intended;

$W^{17}$ is hydrogen or alkyl of 1 to 3 carbon atoms;

with the proviso that one of $W^{15-17}$ is -X*-A*, wherein X* is

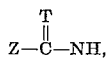

wherein T is oxygen or =NH and Z is hydrocarbylene of from 1 to 10 carbon atoms, and A* is of the formula:

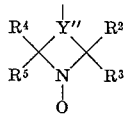

wherein:

$R^{2-5}$ is alkyl of from 1 to 3 carbon atoms and $Y'$ is a trivalent hydrocarbon radical of from 1 to 3 carbon atoms and having from 0 to 1 site of ethylenic unsaturation.

2. A spin labeled reagent according to claim 1, according to the formula:

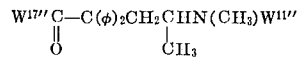

wherein one of $W^{11''}$ or $W^{17''}$ is -X*-A*; when other than -X*-A*

$W^{11}$ is methyl; and $W^{17}$ is propyl;

$\phi$ is phenyl;

X* is —ZCONH, wherein Z is hydrocarbylene of from 1 to 7 carbon atoms, having from 0 to 1 site of ethylenic unsaturation.

3. A spin labeled reagent according to claim 2, which is N-(2',2',5',5'-tetramethylpyrrolidin-3'-yl-1'-oxyl) 6-keto-7,7-diphenyl-9-(dimethylamino)decanamide.

* * * * *